US012520238B2

(12) United States Patent
Höglund et al.

(10) Patent No.: US 12,520,238 B2
(45) Date of Patent: *Jan. 6, 2026

(54) SYSTEM INFORMATION BROADCAST FOR MACHINE-TYPE COMMUNICATION

(71) Applicant: Telefonaktiebolaget LM Ericsson (publ), Stockholm (SE)

(72) Inventors: Andreas Höglund, Solna (SE); Kai-Erik Sunell, Bromma (SE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 264 days.

This patent is subject to a terminal disclaimer.

(21) Appl. No.: 17/139,646

(22) Filed: Dec. 31, 2020

(65) Prior Publication Data
US 2021/0127330 A1    Apr. 29, 2021

Related U.S. Application Data

(63) Continuation of application No. 14/911,195, filed as application No. PCT/SE2014/050641 on May 26, 2014, now Pat. No. 10,912,028.
(Continued)

(51) Int. Cl.
H04W 52/02    (2009.01)
H04W 4/70     (2018.01)
(Continued)

(52) U.S. Cl.
CPC ......... H04W 52/0216 (2013.01); H04W 4/70 (2018.02); H04W 48/08 (2013.01);
(Continued)

(58) Field of Classification Search
None
See application file for complete search history.

(56) References Cited

U.S. PATENT DOCUMENTS 8,310,948 B2 * 11/2012 Ishii .................. H04W 28/16
                                                        370/252
8,478,286 B1    7/2013 Fan et al.
(Continued)

FOREIGN PATENT DOCUMENTS

CN    101772928 A    7/2010
CN    102170659 A    8/2011
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.10.0, Jun. 2013, 1-307.
(Continued)

Primary Examiner — Andrew C Oh
(74) Attorney, Agent, or Firm — Murphy, Bilak & Homiller, PLLC

(57) ABSTRACT

There is provided a method of operating a network node in a communication network, the method comprising transmitting information required by a mobile device for reliable communications with the communication network to mobile devices in a single information block. Also provided is a method of operating a mobile device in a communication network, the method comprising receiving information required by the mobile device for reliable communications with the communication network in a single information block from the communication network. A network node and mobile device are also provided that are configured to perform the respective methods.

20 Claims, 5 Drawing Sheets

Related U.S. Application Data

(60) Provisional application No. 61/863,984, filed on Aug. 9, 2013.

(51) Int. Cl.
*H04W 48/08* (2009.01)
*H04W 48/12* (2009.01)
*H04W 76/20* (2018.01)
*H04W 76/28* (2018.01)
*H04W 68/02* (2009.01)

(52) U.S. Cl.
CPC ....... *H04W 48/12* (2013.01); *H04W 52/0206* (2013.01); *H04W 76/20* (2018.02); *H04W 76/28* (2018.02); *H04W 68/02* (2013.01); *Y02D 30/70* (2020.08)

(56) References Cited

U.S. PATENT DOCUMENTS

| | | | |
|---|---|---|---|
| 9,084,074 B2* | 7/2015 | Jang | H04W 4/90 |
| 10,912,028 B2* | 2/2021 | Höglund | H04W 52/0206 |
| 2002/0013147 A1* | 1/2002 | Fauconnier | H04W 12/037 455/411 |
| 2005/0073977 A1* | 4/2005 | Vanghi | H04W 36/00698 370/335 |
| 2005/0176474 A1* | 8/2005 | Lee | H04B 7/26 455/574 |
| 2006/0111127 A1* | 5/2006 | Jang | H04W 68/00 455/458 |
| 2006/0195576 A1* | 8/2006 | Rinne | H04W 72/23 709/226 |
| 2007/0049344 A1 | 3/2007 | Van Der Velde et al. | |
| 2008/0020763 A1* | 1/2008 | Fischer | H04W 72/30 455/435.1 |
| 2008/0096557 A1* | 4/2008 | Rinne | H04W 8/26 455/435.1 |
| 2008/0102896 A1* | 5/2008 | Wang | H04W 60/04 455/560 |
| 2008/0200146 A1* | 8/2008 | Wang | H04J 11/0069 455/410 |
| 2008/0207228 A1 | 8/2008 | Catovic et al. | |
| 2008/0261531 A1* | 10/2008 | Huang | H04W 72/30 455/63.1 |
| 2008/0267309 A1* | 10/2008 | Saini | H04W 48/10 375/267 |
| 2009/0203376 A1* | 8/2009 | Sambhwani | H04W 48/16 455/434 |
| 2009/0232118 A1 | 9/2009 | Wang et al. | |
| 2009/0238141 A1* | 9/2009 | Damnjanovic | H04W 36/18 370/331 |
| 2009/0239533 A1* | 9/2009 | Somasundaram | H04W 48/16 455/434 |
| 2009/0274086 A1* | 11/2009 | Petrovic | H04W 48/10 370/254 |
| 2010/0015969 A1* | 1/2010 | Lee | H04W 84/042 455/422.1 |
| 2010/0022250 A1* | 1/2010 | Petrovic | H04J 11/0093 455/450 |
| 2010/0067496 A1* | 3/2010 | Choi | H04W 52/54 370/336 |
| 2010/0120452 A1* | 5/2010 | Somasundaram | H04W 74/002 455/458 |
| 2010/0130218 A1* | 5/2010 | Zhang | H04W 74/0833 455/458 |
| 2010/0189032 A1* | 7/2010 | Chen | H04B 1/7143 370/328 |
| 2010/0195568 A1* | 8/2010 | Iimori | H04W 36/00224 370/328 |
| 2010/0227569 A1 | 9/2010 | Bala et al. | |
| 2010/0234034 A1* | 9/2010 | Aoyama | H04W 4/06 455/450 |
| 2011/0021224 A1 | 1/2011 | Koskinen et al. | |
| 2011/0026493 A1* | 2/2011 | Gao | H04W 24/02 370/332 |
| 2011/0028171 A1* | 2/2011 | Guo | H04L 5/0053 455/502 |
| 2011/0081903 A1* | 4/2011 | Cai | H04W 36/0058 455/424 |
| 2011/0201307 A1* | 8/2011 | Segura | H04W 4/70 455/411 |
| 2011/0216732 A1* | 9/2011 | Maeda | H04W 4/08 370/329 |
| 2011/0237218 A1* | 9/2011 | Aoyama | H04W 76/50 455/404.1 |
| 2011/0268085 A1* | 11/2011 | Barany | H04W 36/0033 370/331 |
| 2011/0274040 A1* | 11/2011 | Pani | H04W 4/70 370/328 |
| 2012/0039171 A1 | 2/2012 | Yamada et al. | |
| 2012/0064903 A1 | 3/2012 | Pani et al. | |
| 2012/0113843 A1* | 5/2012 | Watfa | H04W 72/23 370/252 |
| 2012/0115471 A1* | 5/2012 | Awoniyi | H04W 52/0206 455/435.1 |
| 2012/0157095 A1 | 6/2012 | Fodor et al. | |
| 2012/0170515 A1* | 7/2012 | Patil | H04W 48/12 370/328 |
| 2012/0252517 A1 | 10/2012 | Karampatsis et al. | |
| 2012/0269122 A1* | 10/2012 | Lee | H04W 76/36 370/328 |
| 2012/0269172 A1* | 10/2012 | Chin | H04W 36/326 370/332 |
| 2012/0269173 A1* | 10/2012 | Chin | H04W 68/12 370/332 |
| 2012/0275329 A1* | 11/2012 | Chin | H04W 64/00 370/252 |
| 2012/0281566 A1 | 11/2012 | Pelletier et al. | |
| 2012/0300685 A1* | 11/2012 | Kim | H04W 76/28 370/311 |
| 2012/0307791 A1* | 12/2012 | Veres | H04W 36/322 370/331 |
| 2013/0010619 A1* | 1/2013 | Fong | H04W 74/0833 370/252 |
| 2013/0010964 A1* | 1/2013 | Fong | H04L 5/0094 370/329 |
| 2013/0016639 A1 | 1/2013 | Xu et al. | |
| 2013/0017841 A1* | 1/2013 | Kazmi | G01S 5/0236 455/456.1 |
| 2013/0027247 A1* | 1/2013 | Fodor | G01S 19/11 342/357.29 |
| 2013/0028126 A1 | 1/2013 | Kazmi | |
| 2013/0044652 A1* | 2/2013 | Wang | H04L 5/1469 370/280 |
| 2013/0083753 A1 | 4/2013 | Lee et al. | |
| 2013/0084809 A1* | 4/2013 | Johansson | H04W 76/19 455/67.11 |
| 2013/0107723 A1* | 5/2013 | Dhanda | H04W 76/28 370/241 |
| 2013/0130691 A1* | 5/2013 | Zhu | H04W 48/08 455/436 |
| 2013/0143548 A1* | 6/2013 | Rayavarapu | H04W 48/20 455/423 |
| 2013/0170479 A1* | 7/2013 | Fong | H04W 72/0446 370/336 |
| 2013/0215742 A1 | 8/2013 | Sirotkin et al. | |
| 2013/0258919 A1 | 10/2013 | Damnjanovic | |
| 2013/0258938 A1* | 10/2013 | Sagfors | H04W 72/02 370/312 |
| 2013/0265926 A1* | 10/2013 | Stein | H04W 72/30 370/312 |
| 2013/0281090 A1* | 10/2013 | Maeda | H04W 48/16 455/434 |
| 2013/0288694 A1* | 10/2013 | Mochizuki | H04W 72/04 455/450 |
| 2013/0301492 A1* | 11/2013 | Ji | H04L 5/0096 370/280 |
| 2013/0301552 A1* | 11/2013 | Xu | H04B 7/0413 370/329 |

(56) References Cited

U.S. PATENT DOCUMENTS

| | | | |
|---|---|---|---|
| 2013/0308552 A1 | 11/2013 | Madan et al. | |
| 2013/0315122 A1 | 11/2013 | Sirotkin et al. | |
| 2014/0018085 A1 | 1/2014 | Young et al. | |
| 2014/0051426 A1* | 2/2014 | Siomina | H04W 48/16 455/422.1 |
| 2014/0112180 A1* | 4/2014 | Axmon | H04W 24/08 370/252 |
| 2014/0119255 A1 | 5/2014 | Vannithamby et al. | |
| 2014/0200006 A1* | 7/2014 | Gao | H04W 36/04 455/438 |
| 2014/0204772 A1* | 7/2014 | Zhang | H04W 48/16 370/252 |
| 2014/0241225 A1* | 8/2014 | Novak | H04W 72/02 370/336 |
| 2014/0247742 A1 | 9/2014 | Lee et al. | |
| 2014/0307720 A1 | 10/2014 | Koslela et al. | |
| 2014/0321416 A1* | 10/2014 | Pragada | H04W 76/28 370/329 |
| 2014/0342736 A1* | 11/2014 | Zhang | H04W 60/00 455/435.1 |
| 2015/0036574 A1 | 2/2015 | Uemura et al. | |
| 2015/0087296 A1* | 3/2015 | Kim | H04W 52/04 455/422.1 |
| 2015/0117283 A1 | 4/2015 | Wei et al. | |
| 2015/0173039 A1* | 6/2015 | Rune | H04W 52/0216 370/311 |
| 2015/0250017 A1 | 9/2015 | Ingale et al. | |
| 2015/0264551 A1 | 9/2015 | Ko et al. | |
| 2015/0280894 A1 | 10/2015 | Charbit et al. | |
| 2015/0341978 A1* | 11/2015 | Rune | H04W 48/12 370/254 |
| 2015/0358998 A1 | 12/2015 | Golitschek Edler Von Elbwart et al. | |
| 2016/0174135 A1 | 6/2016 | Yan et al. | |

FOREIGN PATENT DOCUMENTS

| | | | | |
|---|---|---|---|---|
| CN | 102812755 A | | 12/2012 | |
| CN | 102917444 A | * | 2/2013 | ........ H04W 52/0216 |
| CN | 103069869 A | | 4/2013 | |
| CN | 103096438 A | * | 5/2013 | ............ H04W 72/12 |
| EP | 2523366 A2 | * | 11/2012 | ............... H04W 4/70 |
| EP | 2742616 B1 | * | 10/2019 | ............... H04W 4/70 |
| GB | 2491866 A | * | 12/2012 | ............ H04W 72/23 |
| KR | 20120122791 A | * | 11/2012 | ............... H04W 4/70 |
| WO | WO-2010059813 A1 | * | 5/2010 | ........ H04W 74/0833 |
| WO | WO-2011017912 A1 | * | 2/2011 | ............ H04W 72/30 |
| WO | 2011085238 A2 | | 7/2011 | |
| WO | WO-2011087233 A2 | * | 7/2011 | ............ H04W 76/28 |
| WO | WO-2013015658 A2 | * | 1/2013 | ............... H04W 4/70 |
| WO | WO-2013031152 A1 | * | 3/2013 | ............ H04W 72/23 |
| WO | WO-2013149666 A1 | * | 10/2013 | ............ H04W 68/02 |
| WO | WO-2014098663 A1 | * | 6/2014 | ............ H04W 48/12 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.4.0, Jun. 2013, 1-346.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, 1-344.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.

3GPP, "3rd Generation Partnership Project; Technical Specification Group Radio Access Network; Radio Resource Control (RRC); Protocol specification (Release 11)", 3GPP TS 25.331 V11.6.0, Jun. 2013, 1-2084.

3GPP, "3rd Generation Partnership Project; Technical Specification Group Radio Access Network; Study on Enhancements to Machine-Type Communications (MTC) and other Mobile Data Applications; Radio Access Network (RAN) aspects (Release 12)", 3GPP TR 37.869 V12.0.0, Sep. 2013, 1-43.

Hongyan, "LTE System Information: Part 1", LTE University, Expert Opinion, Aug. 9, 2010, 1-2.

Unknown, Author, "Supporting Extended Long DRX Cycle", Alcatel-Lucent Shanghai Bell, Acatei-Lucent, 3GPP TSG RAN WG2 Meeting #82, R2-132030, Fukuoka, Japan,, May 20-24, 2013, 1-4.

* cited by examiner

```
                           MasterInformationBlock
-- ASN1START

MasterInformationBlock ::=      SEQUENCE {
    dl-Bandwidth                    ENUMERATED {
                                        n6, n15, n25, n50, n75, n100},
    phich-Config                    PHICH-Config,
    systemFrameNumber               BIT STRING (SIZE (8)),
    spare                           BIT STRING (SIZE (10))
}

-- ASN1STOP
```

Figure 7

| Information Element/Group name | Need | Multi | Type and reference | Semantics description | Version |
|---|---|---|---|---|---|
| Other information elements | | | | | |
| MIB Value tag | MP | | MIB Value tag 10.3.8.9 | | |
| CN information elements | | | | | |
| Supported PLMN types | MP | | PLMN Type 10.3.1.12 | | |
| PLMN Identity | CV-GSM | | PLMN Identity 10.3.1.11 | | |
| Multiple PLMN List | OP | | Multiple PLMN List 10.3.1.7a | If present, this IE specifies the PLMNs of the cell. If absent, the IE "PLMN Identity" specifies the PLMN of the cell. | REL-6 |
| ANSI-41 information elements | | | | | |
| ANSI-41 Core Network Information | CV-ANSI-41 | | ANSI-41 Core Network Information 10.3.9.1 | | |
| References to other system information blocks and scheduling blocks | MP | | References to other system information blocks and scheduling blocks 10.3.8.14 | | |
| CSG Indicator | OP | | Enumerated (TRUE) | If present, the cell is a CSG cell (see [4]). If absent, the cell is not a CSG cell. | REL-8 |

Figure 8

SYSTEM INFORMATION BROADCAST FOR MACHINE-TYPE COMMUNICATION

TECHNICAL FIELD

The technology described relates to telecommunication networks, and in particular to the signalling of network or system information to allow mobile devices to extend a discontinuous reception (DRX) period.

BACKGROUND

In a typical cellular radio system, radio or wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (in a Universal Mobile Telecommunications System (UMTS) network) or "eNodeB" (in a Long Term Evolution (LTE) network). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

In some radio access networks, several base stations may be connected (e.g., by landlines or microwave) to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). Universal Terrestrial Radio Access Network (UTRAN) is essentially a radio access network using wideband code division multiple access (WCDMA) for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. The first release for the Evolved Universal Terrestrial Radio Access Network (E-UTRAN) specification has issued, and as with most specifications, the standard is likely to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network (via Access Gateways (AGWs)) rather than to radio network controller (RNC) nodes. In general, in LTE the functions of a radio network controller (RNC) node are distributed between the radio base stations nodes (eNodeBs in LTE) and AGWs. As such, the radio access network (RAN) of an LTE system has what is sometimes termed a "flat" architecture including radio base station nodes without reporting to radio network controller (RNC) nodes.

A currently popular vision of the future of cellular networks includes machines or other autonomous devices communicating between each other (or with an application server) without human interaction. A typical scenario is to have sensors sending measurements infrequently, where each of the transmissions would consist of only small amounts of data. This type of communication is called machine to machine (M2M) communication in the literature, or machine-type communication (MTC), in 3GPP.

UEs in cellular systems (such as 3GPP WCDMA, LTE) are most commonly battery driven and the power consumption of these devices is therefore an important factor.

In the context of MTC, many of the devices are expected to be battery operated as well. Sensors and other devices may reside in remote locations and the number of deployed devices could be so large that it would be practically infeasible to replace or frequently recharge the batteries in these kinds of devices. Thus, it is an important goal to aim for reduction in the power consumption when considering improvements for current cellular systems.

An existing means to reduce the battery power consumption is to use discontinuous reception (DRX), a feature in which the UE's receiver is switched off except at configured intervals.

Currently the longest specified DRX cycle lengths are 2.56 seconds and 5.12 seconds for EUTRA and UTRA, respectively. However, it would beneficial to extend the DRX cycle lengths beyond currently specified values to further reduce the battery power consumption, especially for the benefit of MTC devices where there is no possibility for interactive charging of the battery on a regular basis. Although longer DRX cycle lengths naturally cause larger delays in the downlink, this is typically not a problem for delay insensitive traffic such as that generated by MTC devices.

In view of the potential increase in the use of MTC devices, consideration is being given to enhancements to the standards to improve machine type communication. The objective is to facilitate efficient transfer of infrequent and small amounts of data with reduced signalling towards the core network and with prolonged battery lifetime for MTC devices.

It is important for the mobile device to maintain up-to-date system information because otherwise it cannot interact with the network in an interoperable manner. In particular, the mobile device must acquire the latest version of system information prior to access, which means that it cannot access the system (e.g. transmit random access requests, etc.) before it has assured that it has the latest version of the system information. On the other hand, frequent acquisition of system information has an adverse impact on the battery life time.

Thus, aspects of the improvements being considered for the standards include the impact of the acquisition of information required by the mobile device to reliably communicate with the network on battery power consumption and the impact of extended DRX cycles on mobility procedures. In E-UTRA networks, the information required to enable reliable communications with the network is referred to as System Information and is transmitted to the UE in System Information Blocks (SIBs).

SUMMARY

For reliable communications in E-UTRAN, a UE is required to maintain synchronisation with the System Frame Number (SFN), which the UE uses to keep synchronisation with the network and which acts as a timing reference, and the UE is required to learn whether it has moved to another cell, acquire information about cell barring and access class barring before transmitting anything. Currently, all that information is placed in different system information blocks (SIBs) and these blocks are scheduled in different manners. For example, SFN is placed in a Master Information Block (MIB) which is scheduled with a fixed period. The Cell ID and cell barring information is placed in a System Information Block (SIB) type 1, which is also scheduled periodically but with a different fixed periodicity than the MIB. Access class barring for MTC devices is provided in SIB type 14, which is scheduled dynamically. System Information (SI), Master Information Block (MIB) and System Information Block type 1 (SIB1) are defined in section 5.2 (and subsections) of 3GPP TS 36.331 v11.3.0 (2013 March).

In order to find dynamically scheduled SIBs (such as SIB type 14 that contains the access class barring information), the UE needs to acquire information on the scheduling of the SIBs. This scheduling information is included in a scheduling list field that is found in SIB type 1. Thus, the acquisition of SIB type 14 therefore requires acquisition of SIB type 1 first. Those skilled in the art will appreciate that there are other important protocol fields and blocks in addition to those described above that are (or may be, depending on the protocol being used) required by a UE in order to facilitate reliable communications.

In any case, it is clear that after waking up from a very long DRX cycle (i.e. a long period in which the receiver in the UE has been deactivated), the UE typically needs to receive and read at least three blocks, which has an adverse impact on the battery lifetime of the MTC device. Similar constraints apply in other types of network to EUTRAN.

Thus, improvements to the operation of a network node (e.g. a base station) and mobile device are described to allow for a more battery-efficient operation of the mobile device when extending the discontinuous reception (DRX) cycle time beyond the current limits. It will be appreciated that these improvements are not limited to use in EUTRAN, and can be applied to other types of networks, for example UTRAN or WCDMA RAN.

According to an aspect, the information required by a mobile device for reliable communications with a communication network is transmitted by the network in a single information block that is referred to herein as an extended DRX information block since it supports the extension of DRX beyond the current maximum durations. In an embodiment, the extended DRX information block contains all relevant and critical system information required by mobile devices for maintaining reliable communications with the network. This new information block is provided particularly for use by MTC devices to enable longer DRX cycle lengths (i.e. longer periods of time between activation of the receiver), and the network transmits this block while continuing to transmit the existing information blocks (e.g. the MIB and SIBs 1 and 14 as described above in EUTRAN) that are used by mobile devices that are not using DRX or that are using DRX using the established DRX cycle lengths (e.g. up to 5.12 s in EUTRAN).

In some embodiments the extended DRX information block comprises any one or more of the following information types/elements:

a System Frame Number that is extended (either through the provision of additional bits to be read together with the systemFrameNumber field or a new field)

Access class barring info and cell barring info, and an optional additional bit that can indicate that all MTC UE devices are prohibited from doing random access UTC/global positioning system (GPS) time Cell ID System information (SI) change notification a value tag that indicates whether information in one or more system information blocks has changed Carrier, bandwidth, inter-RAT or mobility specific information for MTC devices Closed Subscriber Group info Public Land Mobile Network (PLMN) information Tracking area Coverage enhancement information Any other information from SIB type 1 or other SIB types that is useful or required by a mobile device to operate with an extended DRX cycle.

To enable the mobile device to find the new information block (i.e. to enable the mobile device to know when to expect to receive the information block), the new information block is preferably scheduled in a similar way to the current MIB, i.e. it is transmitted by the network on a defined fixed schedule.

Preferably, some or all of the information in the new information block is provided in a compact form to reduce the size of the information block (and thus reduce the receiving and reading time for the mobile device) and reduce the impact on existing system information broadcasts. For example, the extended DRX information block can comprise one or more indicators or flags (e.g. value tag(s)) that show whether any of the required system information has changed.

Thus, the use of this new information block means that the time that the mobile device needs to have an active receiver after waking up from an extended DRX cycle is reduced in comparison to existing system information broadcasting where the mobile device needs to receive and read information from multiple information blocks.

According to a first aspect, there is provided a method of operating a network node in a communication network, the method comprising transmitting information required by a mobile device for reliable communications with the communication network to mobile devices in a single information block.

In preferred embodiments the single information block is for use by mobile devices operating in a discontinuous reception, DRX, mode of operation.

In some embodiments the information required by a mobile device for reliable communications with the communication network comprises a timing reference, information about whether the mobile device has moved cell in the communication network, information about cell barring and access class barring.

In some embodiments the information required by a mobile device for reliable communications with the communication network comprises any one or more of a System Frame Number, access class barring information and cell barring information, coordinated universal time, UTC/global positioning system, GPS, time, a Cell ID, a System Information, SI, change notification, a value tag that indicates whether information in one or more system information blocks has changed, carrier, bandwidth, inter-Radio Access Technology, RAT, or mobility specific information for machine-type communication, MTC, devices, Closed Subscriber Group information, Public Land Mobile Network, PLMN, information, tracking area and coverage enhancement information.

In some embodiments the single information block comprises an extended System Frame Number having a greater number of values than a System Frame Number transmitted in a Master Information Block.

In some embodiments the extended System Frame Number corresponds to a System Frame Number transmitted in a Master Information Block and one or more additional bits.

In alternative embodiments the extended System Frame Number is determined from the System Frame Number and coordinated universal time, UTC.

In alternative embodiments the single information block comprises information for enabling a mobile device to maintain synchronisation with a network node using a mechanism based on coordinated universal time, UTC.

In some embodiments the method comprises repeating the transmission of the single information block according to a fixed schedule.

In some embodiments the method comprises repeating the transmission of the single information block as frequently or less frequently than a Master Information Block that is transmitted to mobile devices in the communication network.

In some embodiments the method further comprises the step of compiling the information required by a mobile device for reliable communications with the communication network from information in two or more other information blocks transmitted to mobile devices in the communication network.

In some embodiments the two or more other information blocks comprise two or more of a Master Information Block and/or one or more System Information Blocks. The one or more System Information Blocks comprise one or more of System Information Block type 1 and System Information Block type 14.

In alternative embodiments the two or more other information blocks comprises at least a Master Information Block. In those embodiments, the two or more other information blocks can further comprise one or more System Information Blocks. The one or more System Information Blocks can comprise one or more of System Information Block type 1 and System Information Block type 14.

In preferred embodiments, the method further comprises the step of transmitting the Master Information Block and/or the one or more System Information Blocks to mobile devices in the communication network.

In some embodiments the single information block and the Master Information Block and/or the one or more System Information Blocks are transmitted to the mobile devices on the same channel.

In some embodiments the step of transmitting the Master Information Block and/or the one or more System Information Blocks comprises transmitting the Master Information Block and/or the one or more System Information Blocks with an indication that the network node is transmitting the single information block that comprises the information required by a mobile device for reliable communications with the communication network.

In some embodiments the single information block comprises one or more indicators or flags that indicate whether any of the information in the single information block has changed. In some embodiments the one or more indicators or flags indicate whether any of the information contained in one or more System Information Blocks that are transmitted to mobile devices in the communication network has changed.

In some embodiments the single information block comprises the information required by a mobile device for reliable communications with the communication network in a compressed form.

In some embodiments the method further comprises the steps of: detecting whether there are mobile devices in a cell or the communication network that are capable of receiving the single information block; and performing the step of transmitting the single information block if there are mobile devices in the cell or communication network that are capable of receiving the single information block.

In some embodiments the step of detecting comprises receiving an indication from mobile devices that are capable of receiving the single information block.

In some embodiments the method further comprises the steps of: starting a timer when there are mobile devices in the cell or communication network that are capable of receiving the single information block; and transmitting the single information block until the timer expires.

In some embodiments the method further comprises the step of restarting the timer when a new mobile device arrives in the cell or communication network that is capable of receiving the single information block.

In alternative embodiments the method further comprises the steps of: starting a timer when all mobile devices that are capable of receiving the single information block have left the cell; and transmitting the single information block until the timer expires.

In some embodiments the step of transmitting the single information block comprises transmitting the single information block according to a discontinuous reception, DRX, cycle for one or more mobile devices.

In some embodiments the communication network is a universal terrestrial radio access network, UTRAN, or an evolved-UTRAN, E-UTRAN.

According to a second aspect, there is provided a computer program product having computer readable code embodied therein, the computer readable code being configured such that, on execution by a suitable computer or processing module, the computer or processing module is caused to perform any of the embodiments of the method described above.

According to a third aspect, there is provided a network node for use in a communication network, the network node comprising a processing module that is configured to cause the transmission of information required by a mobile device for reliable communications with the communication network to mobile devices in a single information block.

Various embodiments of the network node are contemplated in which the network node or the processing module of the network node is configured to perform any of the method embodiments described above.

According to a fourth aspect, there is provided a method of operating a mobile device in a communication network, the method comprising receiving information required by the mobile device for reliable communications with the communication network in a single information block from the communication network.

In some embodiments the method further comprises the step of using the information in the received single information block to operate in a discontinuous reception, DRX, mode.

In some embodiments the method further comprises the step of adapting a discontinuous reception, DRX, mode of operation of the mobile device according to a transmission schedule for the single information block.

In some embodiments the method further comprises the step of receiving a Master Information Block and/or one or more System Information Blocks from the communication network.

In some embodiments the single information block and the Master Information Block and/or the one or more System Information Blocks are received from the communication network on the same channel.

In some embodiments the step of receiving the single information block is performed if the received Master Information Block comprises an indication that the communication network is transmitting the single information block.

In some embodiments the method further comprises the steps of determining if the single information block comprises one or more indicators or flags that indicate whether any of the information required by a mobile device for reliable communications with the communication network has changed; and, if the single information block comprises one or more indicators or flags that the information has changed, receiving a further information block that contains the information that has changed.

In some embodiments the method further comprises the step of providing an indication to the communication network that the mobile device is capable of receiving the single information block.

In some embodiments the method further comprises the steps of activating a receiver or transceiver module in the mobile device in order to receive the single information block; and deactivating the receiver or transceiver module after receiving the single information block.

In some embodiments the receiver or transceiver module are activated to receive the single information block according to a fixed schedule.

In some embodiments the single information block is for use by the mobile device to operate in a discontinuous reception, DRX, mode of operation.

In some embodiments the information required by the mobile device for reliable communications with the communication network comprises a timing reference, information about whether the mobile device has moved cell in the communication network, information about cell barring and access class barring.

In some embodiments the information required by the mobile device for reliable communications with the communication network comprises any one or more of a System Frame Number, access class barring information and cell barring information, coordinated universal time, UTC/global positioning system, GPS, time, a Cell ID, a System Information, SI, change notification, a value tag that indicates whether information in one or more system information blocks has changed, carrier, bandwidth, inter-Radio Access Technology, RAT, or mobility specific information for machine-type communication, MTC, devices, Closed Subscriber Group information, Public Land Mobile Network, PLMN, information, tracking area and coverage enhancement information.

In some embodiments the single information block comprises an extended System Frame Number having a greater number of values than a System Frame Number transmitted in a Master Information Block. The extended System Frame Number can correspond to a System Frame Number transmitted in a Master Information Block and one or more additional bits. Alternatively the extended System Frame Number can be determined from the System Frame Number and coordinated universal time, UTC.

In alternative embodiments the single information block comprises information for enabling the mobile device to maintain synchronisation with a network node using a mechanism based on coordinated universal time, UTC.

In some embodiments the single information block comprises one or more indicators or flags that indicate whether any of the information in the single information block has changed.

In some embodiments the one or more indicators or flags indicate whether any of the information contained in one or more System Information Blocks that are transmitted to mobile devices in the communication network has changed.

In some embodiments the single information block comprises the information required by the mobile device for reliable communications with the communication network in a compressed form.

According to a fifth aspect, there is provided a computer program product having computer readable code embodied therein, the computer readable code being configured such that, on execution by a suitable computer or processing module, the computer or processing module is caused to perform any of the methods described above.

According to a sixth aspect, there is provided a mobile device for use in a communication network, the mobile device comprising a receiver or transceiver module that is configured to receive information required by the mobile device for reliable communications with the communication network in a single information block from the communication network.

Various embodiments of the mobile device are contemplated in which the mobile device or the receiver or transceiver module and/or a processing module of the mobile device is configured to perform any of the method embodiments described above.

According to a seventh aspect, there is provided a network node for use in a communication network, the network node comprising a processor and a memory, said memory containing instructions executable by said processor whereby said network node is operative to transmit information required by a mobile device for reliable communications with the communication network to mobile devices in a single information block.

According to an eighth aspect, there is provided a mobile device for use in a communication network, the mobile device comprising a processor and a memory, said memory containing instructions executable by said processor whereby said mobile device is operative to receive information required by the mobile device for reliable communications with the communication network in a single information block from the communication network.

BRIEF DESCRIPTION OF THE DRAWINGS

FIG. 7 illustrates the information contained in a Master Information Block (MIB) in EUTRAN; and FIG. 8 illustrates the information contained in a Master Information Block (MIB) in UTRAN.

DESCRIPTION OF NON-LIMITING EXAMPLE EMBODIMENTS

Figure 1:
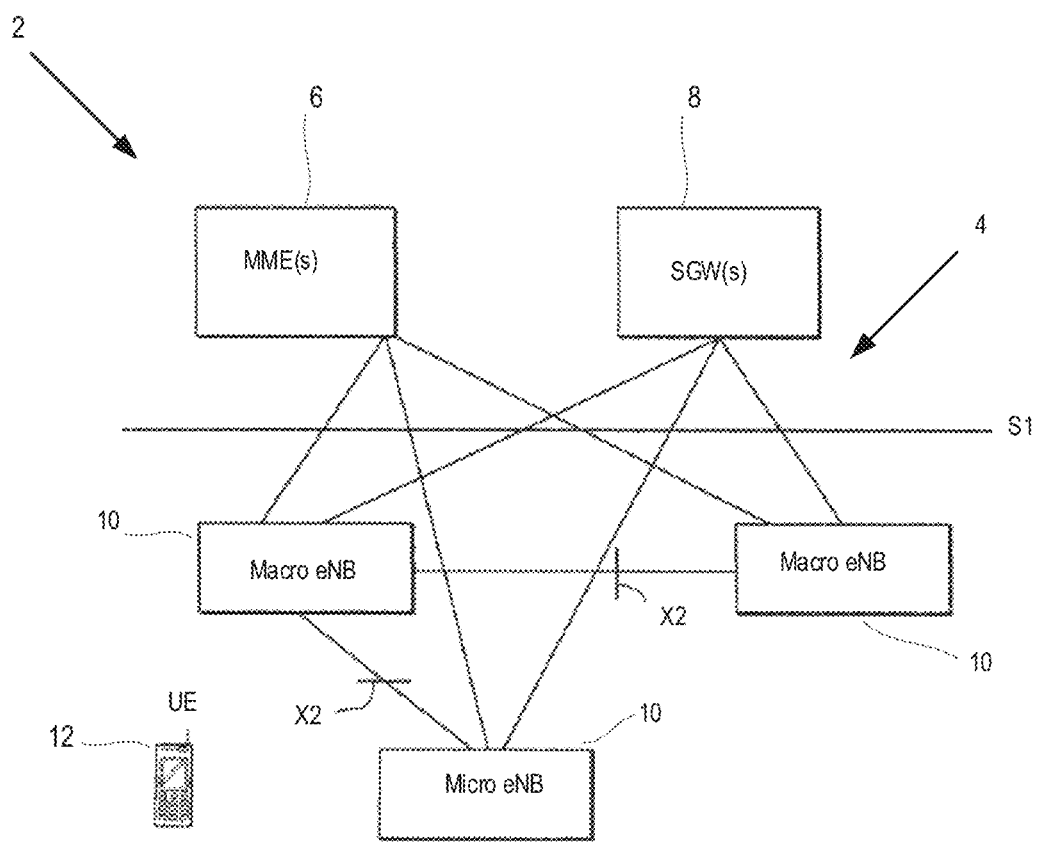
FIG. 1 is a non-limiting example block diagram of an LTE cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in UL and receiving and/or measuring signals in DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode. As well as "UE", the term "mobile device" is used interchangeably in the following description, and it will be appreciated that such a device, particularly a MTC device, does not necessarily have to be 'mobile' in the sense that it is carried by a user. Instead, the term "mobile device" encompasses any device that is capable of communicating with communication networks that operate according to one or more mobile communication standards, such as GSM, UMTS, LTE, etc.

A cell is associated with a base station, where a base station comprises in a general sense any node transmitting radio signals in the downlink (DL) and/or receiving radio signals in the uplink (UL). Some example base stations, or terms used for describing base stations, are eNodeB, eNB, Node B, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node" as used herein can refer to a base station, such as an eNodeB, a network node in the RAN responsible for resource management, such as a radio network controller (RNC), or a core network node, such as a mobility management entity (MME).

The signalling described is either via direct links or logical links (e.g. via higher layer protocols and/or via one or more network nodes). For example, signalling from a coordinating node may pass another network node, e.g., a radio node.

FIG. 1 shows an example diagram of an EUTRAN architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 referred to in LTE as eNBs, over an interface, for example an S1 interface. The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12.

Figure 2:
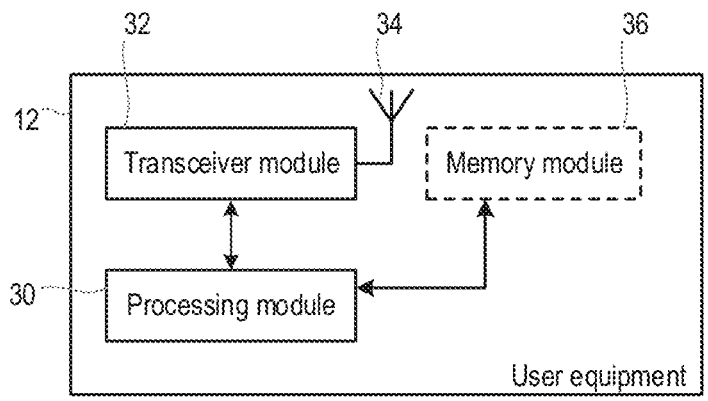
FIG. 2 is a block diagram of a mobile device according to an embodiment.

FIG. 2 shows a user equipment (UE) 12 that can be used in one or more of the non-limiting example embodiments described. The UE 12 may in some embodiments be a mobile device that is configured for machine-to-machine (M2M) or machine-type communication (MTC). The UE 12 comprises a processing module 30 that controls the operation of the UE 12. The processing module 30 is connected to a receiver or transceiver module 32 with associated antenna(s) 34 which are used to receive signals from or both transmit signals to and receive signals from a base station 10 in the network 2. To make use of discontinuous reception (DRX), the processing module 30 can be configured to deactivate the receiver or transceiver module 32 for specified lengths of time. The user equipment 12 also comprises a memory module 36 that is connected to the processing module 30 and that stores program and other information and data required for the operation of the UE 12.

Figure 3:
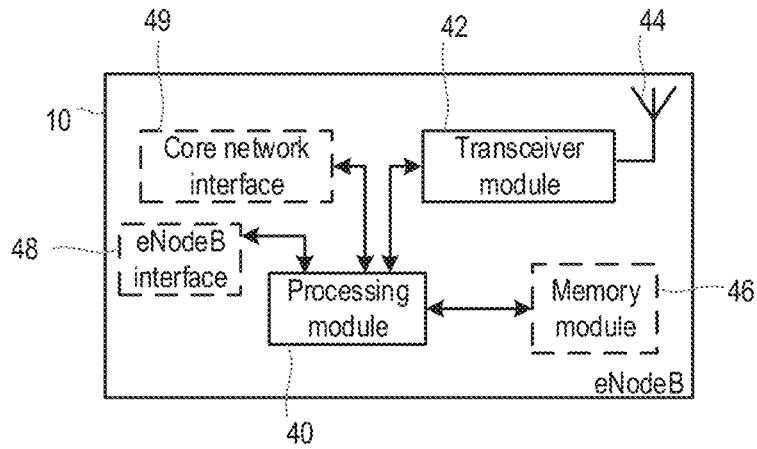
FIG. 3 is a block diagram of a base station according to an embodiment.

FIG. 3 shows a base station 10 (for example a NodeB or an eNodeB) that can be used in example embodiments described. It will be appreciated that although a macro eNB will not in practice be identical in size and structure to a micro eNB, for the purposes of illustration, the base stations 10 are assumed to include similar components. Thus, the base station 10 comprises a processing module 40 that controls the operation of the base station 10. The processing module 40 is connected to a transceiver module 42 with associated antenna(s) 44 which are used to transmit signals to, and receive signals from, user equipments 12 in the network 2. The base station 10 also comprises a memory module 46 that is connected to the processing module 40 and that stores program and other information and data required for the operation of the base station 10. The base station 10 also includes components and/or circuitry 48 for allowing the base station 10 to exchange information with other base stations 10 (for example via an X2 interface) and components and/or circuitry 49 for allowing the base station 10 to exchange information with nodes in the core network 4 (for example via the S1 interface). It will be appreciated that base stations for use in other types of network (e.g. UTRAN or WCDMA RAN) will include similar components to those shown in FIG. 3 and appropriate interface circuitry 48, 49 for enabling communications with the other network nodes in those types of networks (e.g. other base stations, mobility management nodes and/or nodes in the core network).

Figure 4:
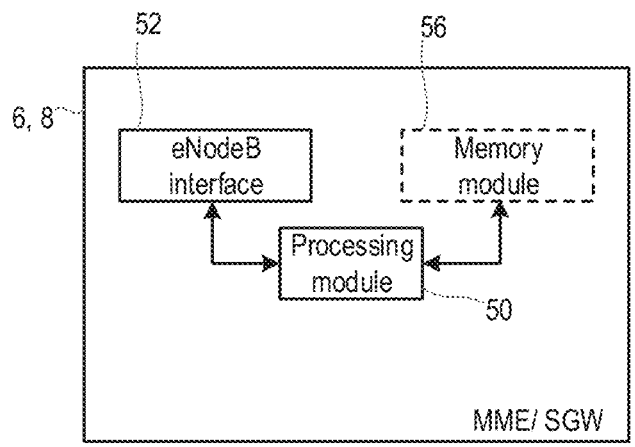
FIG. 4 is a block diagram of a core network node according to an embodiment.

FIG. 4 shows a core network node 6, 8 that can be used in the example embodiments described. The node 6, 8 comprises a processing module 50 that controls the operation of the node 6, 8. The processing module 50 is connected to components and/or circuitry 52 for allowing the node 6, 8 to exchange information with the base stations 10 with which it is associated (which is typically via the S1 interface). The node 6, 8 also comprises a memory module 56 that is connected to the processing module 50 and that stores program and other information and data required for the operation of the node 6, 8.

It will be appreciated that only the components of the UE 12, base station 10 and core network node 6, 8 required to explain the embodiments presented herein are illustrated in FIGS. 2, 3 and 4.

Figure 5:
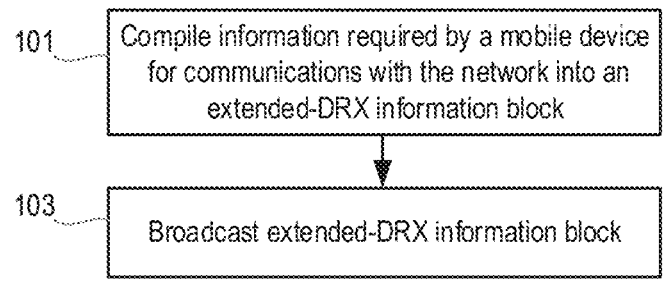
FIG. 5 illustrates an exemplary method of operating a base station or other network node according to an embodiment.

FIG. 5 illustrates an exemplary method of operating a base station 10 or other network node according to an embodiment. In a first step, step 101, the base station 10 or other network node compiles or collects together the information required for a mobile device 12 to communicate reliably with the base station 10 (and thus with the network 2) into a single information block. This single information block is referred to herein as an extended DRX information block. The information compiled into or contained in the extended DRX information block comprises information that the base station 10 already broadcasts to mobile devices 12 at various intervals and in different information blocks (e.g. in Master Information Blocks and different System Information Blocks). The information or types of information that are or can be compiled into the extended DRX information block is described in more detail below.

Then, in step 103, the base station 10 or other network node causes the broadcast of the extended DRX information block compiled in step 101 to mobile devices in the communication network 2. In embodiments where the method is performed in a base station 10, step 103 comprises the base station 10 broadcasting the extended DRX information block. In the embodiments where the method is performed in another network node (e.g. a core network node), step 103 can comprise the network node transmitting the extended DRX information block to a base station 10 for broadcast to the mobile devices, or otherwise to the mobile devices via a base station 10. The extended DRX information block is preferably transmitted on the same channel as the conventional MIB and/or SIBs. The MIB is transmitted on the Physical Broadcast Channel (PBCH) and the SIBs are scheduled on the Physical Downlink Shared Channel (PDSCH).

Preferably, the base station 10 broadcasts the extended DRX information block containing all of the information required by the mobile device 12 while continuing the transmission of network or system information (for example in the MIB and SIBs) according to the conventional schedules (e.g. fixed in the case of MIB and some SIBs and dynamic in the case of others) so that the operation of mobile devices operating with no discontinuous reception or with DRX cycles of up to the currently specified lengths are unaffected by the provision of the new extended DRX information block for mobile devices operating with extended DRX cycle lengths.

The broadcast of the extended DRX information block by the base station 10 in step 103 is preferably performed regularly on a fixed schedule, similar to the MIB. It could be transmitted as frequently as or somewhat less frequently than the legacy MIB. It depends on resource management. Broadcasting is costly. The fixed schedule will be known to mobile devices 10 that are being served by or camped on the base station 10. The schedule could be predefined in a same manner as the scheduling of the legacy MIB but the mobile device 12 could also learn from reading the existing MIB or a SIB that the extended DRX block is being transmitted. In some embodiments the timing of the broadcast or transmission of the extended DRX block can be adapted to the DRX cycle length of one or more mobile devices 12 that are associated with the base station 10.

Figure 6:
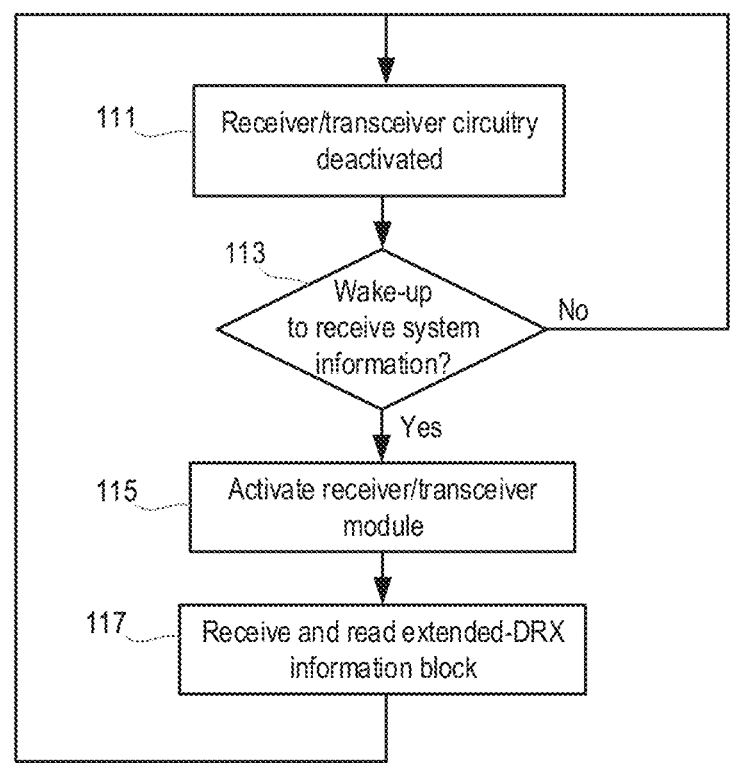
FIG. 6 illustrates a method of operating a mobile device according to an embodiment.

FIG. 6 illustrates a method of operating a mobile device 12 according to an embodiment. In this embodiment the mobile device 12 is operating in a discontinuous reception (DRX) mode which means that the processing module 30 selectively activates and deactivates the receiver or transceiver module 32 in order to reduce the power consumption of the mobile device 12. It will be appreciated that 'activating' and 'deactivating' the receiver or transceiver module 32 can mean respectively supplying and removing power from some or all components of the receiver or transceiver module 32. The transceiver module 32 can be selectively activated to receive paging messages sent to the mobile device 12 and the extended DRX information block described above. Initially (step 111), the receiver or transceiver module 32 is deactivated (i.e. powered down).

As noted above, the mobile device 12 will be aware of the scheduling for the extended DRX information block broadcast by the base station in step 103 above, and the processing module 30 of the mobile device 12 will monitor the current time or a time elapsed since the last broadcast of the extended DRX information block or a time elapsed since the last receipt of an extended DRX information block (in the event that the mobile device is not required to receive each broadcasted instance of the extended DRX information) and determine whether the receiver or transceiver module 32 should be activated in order to receive the extended DRX information block (step 113). If it is not time for the receiver or transceiver module 32 to be activated, the method returns to step 111 and the receiver or transceiver module 32 remains deactivated.

If the processing module 30 determines that the receiver or transceiver module 32 should be activated, then the processing module 30 activates the receiver or transceiver module 32 (step 115) and receives the extended DRX information block broadcast by the base station 10 (step 117). The processing module 30 reads the information from the received extended DRX information block and stores the information in the memory module 36 for use in subsequent communications with the base station 10.

The processing module 30 then deactivates the receiver or transceiver module 32 to continue the DRX cycle (i.e. the method returns to step 111).

It will be appreciated that the mobile device 12 does not need to receive the single information block each time that it is transmitted. A mobile device 12 is responsible for ensuring that it has acquired relevant and up-to-date system information, so it is up to the particular mobile device implementation to decide when to read the single information block.

It will be appreciated that if a mobile device 10 is aware of the transmission schedule for the single information block, the DRX cycle of the mobile device 10 can be adapted so that the receiver or transceiver module 32 is activated when a or any extended DRX information block is being transmitted by the base station 10. This adaptation can comprise adapting the length of the DRX cycle and/or adapting the wake-up times for the receiver or transceiver module 32.

Although the method in FIG. 6 applies to a mobile device 12 that is operating in a DRX mode, it will be appreciated that a mobile device 10 that is not operating in a DRX mode can also receive the extended DRX information block and obtain the information required to communicate with the network 2 from that single block.

As noted above, the new extended DRX information block is intended to be used in such a way that the UE 12 can easily find it without reading, for example, a system information scheduling list. Therefore, the new extended DRX information block is preferably scheduled in a similar manner as the current MIB in EUTRAN, i.e. with a fixed predefined period.

Also as noted above, the new block preferably contains some or all of the information that is required for the UE 12 in order to interact with the system 2 in an interoperable manner. The information is preferably also included in the extended DRX information block in a compact form to reduce the overhead impact on current system information broadcasts (e.g. MIBs and SIBs) and to minimise the time required for the mobile device 12 to read the block.

In the case of an EUTRAN, the extended DRX information block compiled in step 101 preferably contains all of the information currently contained in the Master Information Block MIB, which is shown in FIG. 7. FIG. 7 is an extract from section 6.2.2 "Message Definitions" of 3GPP Technical Specification 36.331 v11.4.0 (2013 June) that shows the content of a Master Information Block (MIB).

In the MIB in FIG. 7, the "dl-Bandwidth" field indicates the transmission bandwidth configuration, $N_{RB}$ in downlink which is described in TS 36.101 [42, table 5.6-1]. n6 corresponds to 6 resource blocks, n15 corresponds to 15 resource blocks and so on.

The "systemFrameNumber" field defines the 8 most significant bits of the system frame number (SFN). 3GPP TS 36.211 [section 21 and 6.6.1] indicates that the 2 least significant bits of the SFN are acquired implicitly in the physical broadcast channel (P-BCH) decoding, i.e. timing of 40 ms P-BCH transmission time interval (TTI) indicates the 2 least significant bits (within 40 ms P-BCH TTI, the first radio frame: 00, the second radio frame: 01, the third radio frame: 10, the last radio frame: 11). One value applies for all serving cells (the associated functionality is common i.e. not performed independently for each cell).

Since it is important for a mobile device 10 to maintain synchronisation with the SFN, the size of the "systemFrameNumber" field effectively defines the maximum possible DRX cycle length. Thus, in preferred embodiments, an extended SFN is provided in the extended DRX information block compiled by the base station 10 and broadcast to the mobile devices 12.

In some embodiments, the extended DRX information block can comprise an SFN of conventional length (e.g. 8 bits) and another field that provides additional bits that are used to effectively extend the SFN to higher values. In an alternative embodiment, a new field is defined that has a greater number of bits than a conventional SFN (e.g. greater than 8 bits) and this is used in place of the conventional SFN field. In another alternative, the extended DRX information block can use a mechanism based on coordinated universal time (UTC) to enable the mobile device 12 to maintain synchronisation with the base station 10. In EUTRAN, UTC is currently specified in SIB type 16, so in this alternative embodiment, this information can be compiled by the base station 10 into the extended DRX information block.

In addition to the information currently found in the MIB, the extended DRX information block preferably includes at least a subset of the information from one or more system information blocks (SIBs) that would normally be transmitted separately to the MIB. For example, preferably information from one or more fields in SIB type 1 and SIB type 14 are included in the extended DRX information block with the information from the MIB. Preferably this additional information provides information about any one or more of cell ID, cell barring and/or access class barring. Thus, the mobile device 12 does not need to acquire multiple blocks (e.g. MIB and one or both of SIB type 1 and SIB type 14) since all the information is placed in the new block.

In various embodiments, the information elements (IEs) contained in the new extended DRX information block could include any one or more of the following:

a System Frame Number that is extended (either through the provision of additional bits to be read together with the systemFrameNumber field or a new field)

Access class barring info and cell barring info (this IE can comprise a notification that an Enhanced Access Class Barring (EAB)-bitmap needs to be read from a conventional system information block, e.g. SIB type 14). The purpose of the EAB bitmap is to reduce random accesses by prohibiting random access requests from UEs that belong to certain access classes. The bit map defines the barred classes. A new bit can also be provided that is used for barring mobile devices 12 with this feature enabled. This single bit can be provided to indicate that all MTC UE devices are prohibited from doing random access. In other words, all access classes for MTC devices are barred. The advantage of this is that MTC devices do not need to read the bit map. There is an overhead reduction as well.

UTC/global positioning system (GPS) time.

Cell ID.

System information (SI) change notification (this can comprise a single bit that is used to signal to mobile devices 12 whether some system information has changed, and if so, signals to the mobile devices 12 that another (conventional) information block (e.g. SIB type 1) needs to be read before data can be transmitted).

A value tag that indicates whether information in one or more system information blocks has changed.

Carrier, bandwidth, inter-RAT or mobility specific information for MTC devices.

Closed Subscriber Group info.

Public Land Mobile Network (PLMN) information. This PLMN information indicates the operator. This is needed to connect to the right network that the Subscriber Identity Module (SIM) card in the UE 12 supports. The UE 12 cannot connect to simply any network that it finds. PLMN information is needed for roaming as well. If the UE 12 is not within the coverage area of the service provider, it finds another one that has an agreement with the subscriber service provider by looking at PLMN info.

Tracking area. The network must be able to find a UE 12 in case there is an incoming call or downlink data. When the UE 12 goes to idle mode it reports its tracking area typically periodically and/or whenever the tracking area is changed. In that way the network finds idle mode UEs by performing paging within its tracking area. Otherwise the network has to page the UE within the entire network which is unreasonable e.g. from a resource consumption point of view. An MTC UE device should know its tracking area and report it to the network.

Coverage enhancement information. It has been discussed that a number (e.g. 3) of repetition levels are used to achieve, for example 5 dB, 10 dB and 15 dB, coverage improvement. The number of levels used in a cell and the number of repetitions can be configurable by the network. Therefore this information could be included in the extended DRX information block. Alternatively or in addition, the extended DRX information block could include a flag indicating whether the cell supports enhanced coverage.

Any other information from SIB type 1 or other SIB types that is useful or required by a mobile device 12 to operate with an extended DRX cycle.

Similar to all other broadcasted information blocks (e.g. MIBs and SIBs), the new extended DRX information block is also subject to size limitations. Thus, as noted above, the information in the new extended DRX information block should be as compressed as possible to minimise the reading time for the mobile device 12. This is not a problem since UEs 12 only use extended DRX if their traffic is delay tolerant, and it is more important to have a small payload in this scenario.

Thus, instead of including the full information fields from e.g. SIB type 1 or SIB type 14, the base station 10 can use a "Value tag" field to indicate to the UEs 12 whether the information in some system information blocks has changed. The value tag field can hold a single bit that can be used to indicate that some information in an unspecified SIB has changed. Alternatively, the value tag field can hold a value number (represented by several bits) for the current system information held by the UE 12. In that way, the UE 12 does not need to receive or acquire any other blocks (e.g. SIBs) unless some of the information in the blocks has changed. It should be noted that this value tag would change upon changes to SIB1, unlike the value tag in SIB1. As system information (SI) is usually changed very infrequently, it will not usually be necessary for the UE 12 to activate the receiver or transceiver module 32 to receive any information blocks other than the extended DRX information block broadcast in step 103.

Alternatively, instead of providing a value tag field, an 'SI change notification' field could be used by the base station 10 to instruct the UE 12 to immediately read a particular information block, e.g. SIB type 1, and to update the system information accordingly. Alternatively, rather than read the next SIB and update the system information immediately, the UE 12 can read the indication in the SI change notification field and note that the system information has changed. Thus, when the UE 12 subsequently wants to transmit data or receive a scheduled data transmission from the base station 10, the UE 12 will know that it has to read an SIB in order to update the system information prior to transmitting or receiving the data. In this way the UE 12 can avoid having to perform multiple system information updates when there is no data to be transmitted by the UE 12.

In order to be able to receive the extended DRX information block defined herein, UEs 12 will need to be adapted read the new block. In the event that not all UEs 12 are adapted to read the new block, UEs 12 can be adapted to transmit an indication to the base station 10 indicating the ability of the UE 12 to read the extended DRX information block. This indication can be a 'capability bit' that simply indicates whether the UE 12 can read the new block or not.

Regarding the way in which the UEs 12 can acquire the block, the network (e.g. base station 10) could indicate to the UEs 12 that the extended DRX information block is being transmitted by providing an indication in the existing MIB. In particular, the existing MIB includes a number of spare bits, and one of these can be used to specify whether the extended DRX information block is being transmitted. After a first reading of the MIB by the UE 12, the UE 12 will know whether or not the new block is scheduled. If the new block is not scheduled, the UE 12 will acquire the required system information from the MIB and other relevant blocks (e.g. SIBs) instead in a conventional manner.

Alternatively, a UE 12 can assume that the extended DRX information block is being transmitted by default (i.e. an indication is not required by the base station 10). In that case, if the UE 12 does not find the new block, it can resort to reading the MIB (and other relevant blocks) instead.

On the network (e.g. EUTRAN) side, the transmission of the new extended DRX information block can be controlled by a network management parameter where the operator can either enable or disable the transmission of the new block. In some embodiments the parameter is cell-specific, which means that transmission of the extended DRX information block can be enabled or disabled transmission in each cell. This embodiment is relatively simple to implement and is useful when it is known, with reasonable probability, when there are UEs 12 in the network that wish to use extended DRX (e.g. MTC-capable UEs).

Alternatively, the decision of whether to transmit the new block can be taken by an algorithm executing in the base station or other network node that dynamically activates the transmission of the extended DRX information block upon detection of MTC capable UEs in the cell or network. This algorithm can make use of an indicator bit that is used by the UE 12 to signal whether it is MTC-capable (and/or wishes to use extended DRX) and that is included in, for example, a Radio Resource Control (RRC) Connection Request message. Thus, after random access, the network (base station 10) knows whether the UE 12 is MTC capable or not. The algorithm can be configured to activate the transmission of the extended DRX information block as soon as it discovers at least one MTC capable UE 12 in the cell (although alternatively more than one UE 12 may be required before the new block is transmitted). The algorithm can also be configured to stop the transmission of the new block on expiry of a timer that is started on the arrival of a MTC capable UE 12 in the cell. If another MTC capable UE 12 arrives in the cell and/or one of the existing MTC UEs 12 in the cell has UL/DL traffic (and/or there is any other indication that there is at least one MTC UE 12 still in the cell), the timer can be restarted. If the timer expires, the transmission of the new block can be stopped. Alternatively, the algorithm can also be configured to stop the transmission of the new block on expiry of a timer that is started on the departure of the last MTC capable UE 12 from the cell. The timer value could be controlled by network management parameters. Although this embodiment is more complex than that presented above, it reduces the broadcast overhead when the population of MTC-capable UE devices 12 is small.

Although the above embodiments of the extended DRX information block relate primarily to its implementation in EUTRA networks, it will be appreciated that an extended DRX information block can be used in other types of networks, such as UTRA networks, to enable extended DRX cycles.

Conventionally, in UTRAN, the way in which system information (SI) is obtained and updated is different than in EUTRAN. In particular, SI changes are indicated differently.

EUTRAN relies on a flag being set in a paging message which is sent out to UEs 12 during a modification period. In particular, when system information is updated in a cell, the UEs 12 are informed about this by the systemInfoModification-flag being set in the paging message. The UEs then read the relevant broadcast (e.g. SIB1) accordingly. The SI modification period is equal to the SFN period or a fraction of it, thus ensuring all UEs have been notified of the SI change. UEs then read and apply the new SI during the following modification period. The boundaries of the modification period are defined for SFN for which SFN mod m=0, where m is the length of the modification period in number of radio frames.

In UTRAN, a value tag for the MIB is included in a paging message which is sent out to UEs 12 (which is larger but more flexible in time). SI updates rely on sending the new value tag for the corresponding information block that contains updated information to all UEs 12 in a cell. The UEs 12 in the cell will read the value tag in the MIB and then read and update the information block if their value tag differs from the one in paging (it will be appreciated that the way in which the modification indication IE is included in the paging differs based on whether the UE 12 is in Idle/PCH states or DCH/FACH states. It is also possible for a modification time to be included in this IE such that the UE 12 is informed about when it should update the system information.

Although a UE 12 in a UTRAN waking up from DRX can just read the value tag in the next MIB and determine that no system information needs to be updated if the value tag is the same as the stored value, this can cause problems since the MIB value tag only has 8 different values, and with longer DRX cycles there is a risk of UEs incorrectly determining they have up-to-date system information (due to the 'wrap-around' of the value tag values).

Thus, the MIB value tag is quite important since this is the value the UE 12 reads in the paged modification information. If the value of the value tag differs from the UEs stored value then the UE 12 will read the MIB. If the value tag in the read MIB is different from the stored value, the UE 12 will then check the scheduling information contained in the MIB and the value tags for all SIBs, and read and store the ones which are not up-to-date. It will be appreciated that UEs 12 operating in the FACH and DCH states may also be able to obtain the scheduling information by other means. Also as noted above, some information blocks use expiration time instead of value tags, which means that the SIB should be re-read when the timer expires.

FIG. 8 illustrates the information contained in a Master Information Block (MIB) in UTRAN. The table in FIG. 8 is taken from section 10.2.48.8.1 of 3GPP TS 25.331 version 11.6.0 Release 11 (2013 July). It can be seen that the MIB includes the value tag field mentioned above.

If any Information Block that has a value tag is updated, the network informs the UEs 12 about this in the IE "BCCH modification info". For UEs 12 in the Idle/PCH state, this IE is contained in PAGING MESSAGE 1 (common) on the paging control channel (PCCH) in all paging occasions of the cell. For UEs 12 in the DCH/FACH state, the IE is contained in SYSTEM INFORMATION CHANGE INDICATION on BCCH.

Thus, in view of the problems with the limited set of values in the MIB value tag field, it is advantageous in UTRAN for an extended DRX information block similar to that described above for EUTRAN to be provided that collects together all of the information relevant for extended DRX in a single block. In particular embodiments, the extended DRX information block contains all of the information from the MIB (e.g. as shown in FIG. 8), but it is provided with a value tag field that has a larger range of values (to reduce the problems with wrap-around for UEs 12 with a long DRX cycle time) or is provided with an additional field that is particularly for use by UEs 12 with a long DRX cycle time that indicates whether there have been any system information changes. The extended DRX information block also preferably includes information from one or more system information blocks so that the extended DRX information block contains all of the system information required by the UE 12 to enable reliable communications with the network 2.

As discussed above, the main benefit provided by the extended DRX information block presented in the above embodiments is that a UE 12 (e.g. an MTC-capable UE) that is using DRX cycle lengths longer than those currently permitted by the standards does not need to read multiple system information blocks, which prolongs the UE's battery life time. Without the above embodiments, a UE 12 with a DRX cycle longer than the modification period would, for example, have to read MIB, SIB 1 and SIB 14 prior to data transmission to ensure that there has not been a System Information change and that the UE 12 is allowed to transmit. As SI change is infrequent, the UE 12 would thus typically read the entire SIB1 unnecessarily.

Also as discussed above, the use of a value-tag field in the new extended DRX information block can further reduce the size of the block which is beneficial for the minimising the use of system information broadcasting resources at the network side and for minimising the reading time at the UE side.

Also as discussed above, certain embodiments in which a spare bit in the existing MIB is used to indicate the presence of the new extended DRX block can decouple the implementation of the new block from other MTC features which is beneficial both for the network and UE implementation. On the other hand, the alternative of sending the new extended DRX block by default in the same manner as the existing MIB (i.e. with a fixed schedule) makes it easier for the UE to find the block because it does not have to read an MIB first.

Activating/deactivating the transmission of the new block with a network management parameter is useful for scenarios where there are plenty of MTC devices in the network because there is no need to implement and test complicated algorithms in the network node. Activating/deactivating the transmission of the new block with an algorithm can in turn save broadcasted bits e.g. when the population of MTC devices is small.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

What is claimed is:

1. A method of operating a network node in a communication network, the method comprising:
repeatedly transmitting a first information block, for reception and use by mobile devices operating in a discontinuous reception (DRX) mode of operation, wherein the information in the first information block comprises a timing reference, information allowing a mobile device to determine whether the mobile device has changed cells in the communication network, and information about cell barring and access class barring, and wherein the timing reference comprises a system frame number (SFN) and bits that extend the SFN to a higher value.

2. The method of claim 1, wherein said repeatedly transmitting comprises repeating the transmission of the first information block on a schedule such that the first information block is transmitted no more frequently than a Master Information Block that is transmitted by the network node for use by mobile devices that are not using DRX.

3. The method of claim 2, wherein the Master Information Block transmitted for use by mobile devices that are not using DRX and/or the one or more System Information Blocks comprises an indication that the network node is transmitting the first information block for use by mobile devices that are not using DRX.

4. The method of claim 1, wherein the method further comprises the step of compiling the information included in the first information block from two or more other information blocks separately transmitted to mobile devices in the communication network.

5. The method of claim 1, wherein the first information block is transmitted to mobile devices on the same channel as a Master Information Block transmitted by the network node for use by mobile devices that are not using DRX or on the same channel as one or more System Information Blocks.

6. The method of claim 1, wherein repeatedly transmitting the single information block comprises transmitting the first information block according to a discontinuous reception (DRX) cycle for one or more mobile devices.

7. A network node for use in a communication network, the network node comprising:
a processor; and
a memory containing instructions executable by said processor whereby the network node that is configured to:
repeatedly transmit a first information block, for reception and use by mobile devices operating in a discontinuous reception (DRX) mode of operation, wherein the information in the first information block comprises a timing reference, information allowing a mobile device to determine whether the mobile device has changed cells in the communication network, and information about cell barring and access class barring, and wherein the timing reference comprises a system frame number (SFN) and bits that extend the SFN to a higher value.

8. The network node of claim 7, wherein the memory comprises instructions such that the network node is configured to repeat the transmission of the first information block on a schedule such that the first information block is transmitted no more frequently than a Master Information Block that is transmitted by the network node for use by mobile devices that are not using DRX.

9. The network node of claim 8, wherein the memory comprises instructions such that the network node is configured to include, in the Master Information Block transmitted for use by mobile devices that are not using DRX and/or in one or more System Information Blocks transmitted by the network node, an indication that the network node is transmitting the first information block for use by mobile devices using DRX.

10. The network node of claim 7, wherein the memory comprises instructions such that the network node is further configured to compile the information included in the first information block from two or more other information blocks separately transmitted to mobile devices in the communication network.

11. The network node of claim 7, wherein the memory comprises instructions such that the network node is configured to transmit the first information block to mobile devices on the same channel as a Master Information Block transmitted for use by mobile devices that are not using DRX or on the same channel as one or more System Information Blocks.

12. The network node of claim 7, wherein the memory comprises instructions such that the network node is configured to cause the transmission of the first information block according to a discontinuous reception (DRX) cycle for one or more mobile devices.

13. A method of operating a mobile device in a communication network, the method comprising:
receiving, while operating in discontinuous reception (DRX) mode, a first information block transmitted repeatedly from the communication network for use by mobile devices operating in DRX mode, wherein the information in the first information block comprises a timing reference, information allowing a mobile device to determine whether the mobile device has changed cells in the communication network, and information about cell barring and access class barring, and wherein the timing reference comprises a system frame number (SFN) and bits that extend the SFN to a higher value; and
using the information in the received first information block to operate in DRX mode.

14. The method of claim 13, the method further comprising the step of:
receiving a Master Information Block and/or one or more System Information Blocks transmitted separately from the first information block by the communication network.

15. The method of claim 14, wherein the first information block is received from the communication network on the same channel as the Master Information Block and/or the one or more System Information Blocks.

16. The method of claim 13, further comprising:
determining whether the first information block includes one or more indicators or flags indicating that any information required by a mobile device for reliable communications with the communication network has changed; and if the first information block comprises one or more indicators or flags that the information has changed, receiving a second information block that contains the information that has changed.

17. A mobile device for use in a communication network, the mobile device comprising:
- a receiver circuit configured to receive, while operating in discontinuous reception (DRX) mode, a first information block transmitted repeatedly from the communication network for use by mobile devices operating in DRX mode, wherein the information in the first information block comprises a timing reference, information allowing a mobile device to determine whether the mobile device has changed cells in the communication network, and information about cell barring and access class barring, and wherein the timing reference comprises a system frame number (SFN) and bits that extend the SFN to a higher value; and
- a processing circuit configured to use the information in the received first information block to operate in DRX mode.

18. The mobile device of claim 17, wherein the receiver circuit is further configured to receive a Master Information Block and/or one or more System Information Blocks transmitted separately from the first information block by the communication network.

19. The mobile device of claim 18, wherein the receiver circuit is configured to receive the first information block from the communication network on the same channel as the Master Information Block and/or the one or more System Information Blocks.

20. The mobile device of claim 17, wherein the processing circuit is further configured to determine whether the first information block includes one or more indicators or flags indicating that any information required by a mobile device for reliable communications with the communication network has changed and to control the receiver circuit or transceiver circuit to receive a further information block that contains the information that has changed if the first information block comprises one or more indicators or flags that the information has changed.

* * * * *